Patented June 14, 1927.

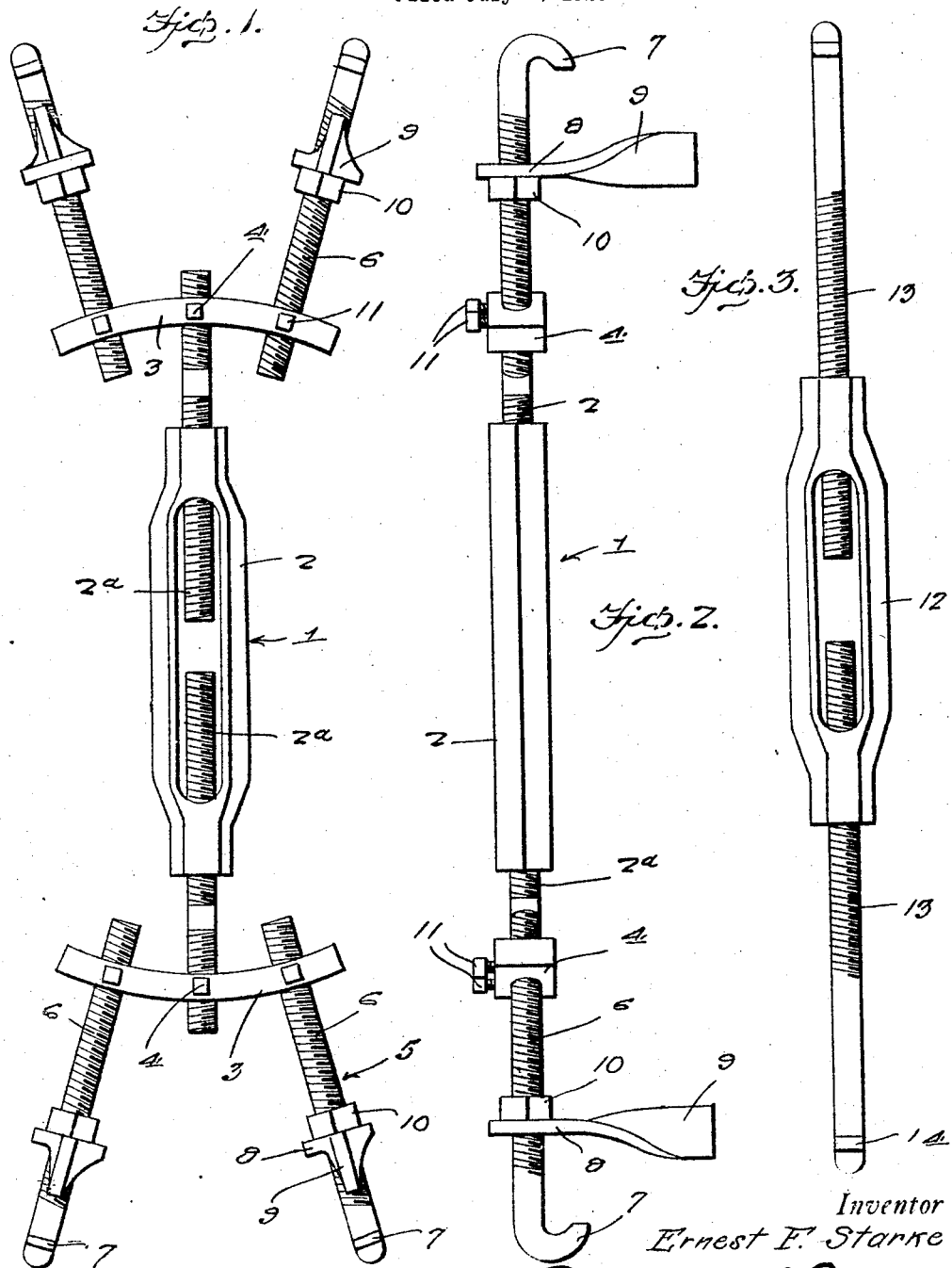

1,632,248

UNITED STATES PATENT OFFICE.

ERNEST F. STARKE, OF RED CLOUD, NEBRASKA.

RIM TOOL.

Application filed July 1, 1926. Serial No. 119,900.

This invention relates to an improved rim tool such as is used for expanding and contracting automobile tire rims to facilitate application and removal of the tire.

My principal aim is to generally improve upon devices of this class by providing one of comparative simplicity and durability, one which is practical in construction and operation, and one which is inexpensive to both the manufacturer and the user.

Other objects and advantages of the invention will become apparent from the following description and drawings.

In the accompanying drawings forming a part of this application, and in which like numerals are employed to designate like parts throughout the same:—

Figure 1 is a top plan view of a tool constructed in accordance with the invention, Fig. 2 is an edge elevation, or a view taken at right angles to Fig. 1, Fig. 3 is a plan view of a slightly modified embodiment of the invention.

Referring to the drawing in detail, it will be seen that the reference character 1 designates, as a whole, a turn buckle which includes a coupling 2 for a pair of screw threaded rods 2ª. Connected to the outer end of each rod is an arcuate head 3, the same being threaded for adjustment at its center upon the rod 2 and being held in place by a set screw 4. Carried at the outer end of each head is a rim clamping device 5 which includes a bolt 6 having a rim hook 7 at its outer end. Slidable on this bolt is a lug 8 having a twisted outer end 9 to engage the back of the automobile rim. This lug is adjusted and held in set position by a nut 10.

It is yet to be pointed out that set screws 11 are connected with the end portions of the head 3 and cooperate with the bolt 6 to hold these in adjusted position. In operation, it is obvious that the rim clamps are engaged with the flange and back of the rim and the turn buckle is adjusted to move them either toward or from each other for expanding or contracting the rim as occasion may demand.

It is also obvious that the device is capable of easy application and removal and may be operated for actuating comparatively sturdy rims. In Fig. 3, I show an improved turn buckle construction including the connector 12 and a pair of relatively long screw threaded shanks 13 having rim engaging end portions 14. Thus, by providing relatively long screw threaded bolts with hooks on the ends, a turn buckle is converted into a novel and simple rim tool.

It is believed that by considering the description in connection with the drawings, persons familiar with devices of this class will be able to obtain a clear understanding of the same. Therefore, a more lengthy description is thought unnecessary.

Minor changes coming within the field of invention claimed may be resorted to if desired.

Having thus described my invention, what I claim as new is:—

In a rim tool of the class described, a turn buckle including a connector and a pair of screw threaded members, an arcuate head connected at a point between its ends to the outer end of said rod, a pair of screw bolts carried by the end portions of said head, said bolts having their outer ends provided with rim engaging hooks, a lug adjustably mounted on each bolt, said lug embodying a plate having a twisted outer end portion adapted to engage the rim, and a retaining nut threaded on each bolt and cooperable with the respective lug.

In testimony whereof I affix my signature.

ERNEST F. STARKE.